(12) United States Patent
Walter

(10) Patent No.: US 8,103,620 B2
(45) Date of Patent: Jan. 24, 2012

(54) METHOD AND APPARATUS FOR ASYNCHRONOUS LOG MESSAGE PROCESSING

(75) Inventor: Wolfgang E. Walter, Hambrucken (DE)

(73) Assignee: SAP Aktiengeselleschaft, Walldorf (DE)

( * ) Notice: Subject to any disclaimer, the term of this patent is extended or adjusted under 35 U.S.C. 154(b) by 302 days.

(21) Appl. No.: 11/378,751

(22) Filed: Mar. 17, 2006

(65) Prior Publication Data
US 2007/0234287 A1    Oct. 4, 2007

(51) Int. Cl.
*G06F 17/30* (2006.01)

(52) U.S. Cl. ............. 707/609; 707/682; 707/999.2; 707/999.204

(58) Field of Classification Search .......... 707/1, 100, 707/101, 104.1, 200, 609, 682, 999.2, 999.204; 709/231, 232; 714/4, 45, 57; 395/185
See application file for complete search history.

(56) References Cited

U.S. PATENT DOCUMENTS

| | | | | |
|---|---|---|---|---|
| 6,052,695 | A * | 4/2000 | Abe et al. | 707/202 |
| 6,115,544 | A * | 9/2000 | Mueller | 714/57 |
| 6,769,079 | B1 * | 7/2004 | Currey et al. | 714/45 |
| 6,922,792 | B2 * | 7/2005 | Moser et al. | 714/4 |
| 2002/0099973 | A1 * | 7/2002 | Moser et al. | 714/11 |
| 2004/0009779 | A1 * | 1/2004 | Qu et al. | 455/466 |
| 2005/0223282 | A1 * | 10/2005 | Frey et al. | 714/20 |

* cited by examiner

*Primary Examiner* — Jean B Fleurantin
*Assistant Examiner* — Anteneh Girma
(74) *Attorney, Agent, or Firm* — Blakely, Sokoloff, Taylor & Zafman LLP

(57) ABSTRACT

A system collects ancillary data objects such as log messages from an application while the application is in use. The data objects may be stored if desired; otherwise, they may be discarded if the application begins a new transaction. Software to perform related methods is also described and claimed.

18 Claims, 4 Drawing Sheets

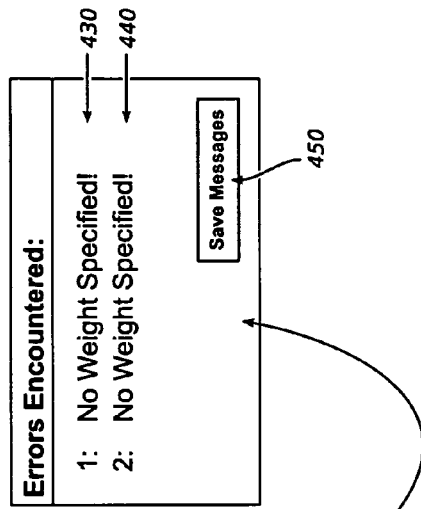
Fig. 4A
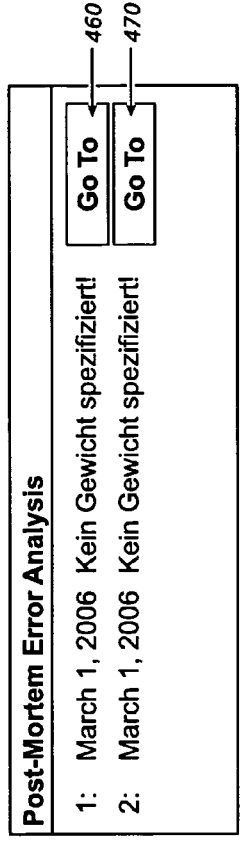
Fig. 4B
Fig. 4C

METHOD AND APPARATUS FOR ASYNCHRONOUS LOG MESSAGE PROCESSING

FIELD

The invention relates to log message processing. More specifically, the invention relates to uncoupling log message processing from processing database and other operations that produce the log messages.

BACKGROUND

Data processing systems often deal with multiple information records, each containing a number of fields of data. Certain fields may be tied to other records, and some or all of the data may be stored in a database. Because of the interrelationships between data fields, adding, changing or deleting records may be a multi-step process. For example, in an order-processing system, creation of a new order may require the order to have at least one item, but an order-item may not be valid without an order "parent." One solution to this sort of "chicken-and-egg" problem is to create a tentative order, a tentative order item, and then to commit the two together in an atomic operation. Some databases provide a way of grouping transactions into a logical unit of work that can be all committed or all rejected. This may solve the problem of preparing a consistent set of changes, when some inconsistencies may arise during the preparation (to be resolved before committing the unit of work), but leads to another, related problem.

While processing a unit of work, derivative data may be generated by the system based on data in the database, entries from a user, or by other operations of an application. In some circumstances, this derivative data may be useful even though the original data from the user or the database is not useful. For example, if the user tries, but fails, to create a consistent set of records, the system may provide error messages to explain why the records are invalid. The user may wish to save the messages—even in the database—but the system may not provide a way to save only part of a unit of work. Committing the work may be an all-or-nothing proposition, and it may be undesirable or impossible to store the inconsistent records just to ensure that the derivative data is also saved. Methods of operating a data processing system to preserve data related to a unit of work, without also saving the work itself, may be of value.

SUMMARY

Embodiments of the invention collect ancillary data generated during the processing of a database or other transaction, but save it through an independent transaction, while an application performing the processing may independently save, discard or cancel the first transaction. Software to implement related methods is also described and claimed.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 4A-4C provide concrete examples of data processing applications operating according to an embodiment of the invention.

DETAILED DESCRIPTION

An application is a computer program, a group of programs, or a software and hardware system that performs a task for its users. While performing the task, an application may collect or generate ancillary data that may not be directly involved in the task, but may nonetheless be of use to the user, an administrator of the application, or someone else. For example, an application may collect statistics about the number of tasks it performs or the average time each task takes, or it may emit log messages describing what it is doing or problems encountered during its operations. This ancillary data may be collected or generated by subsystems of the application, without the knowledge or active involvement of the application. However, a user may wish to capture the ancillary data for later review and analysis. Methods and systems for capturing and making effective use of ancillary data are described below.

Figure 1:
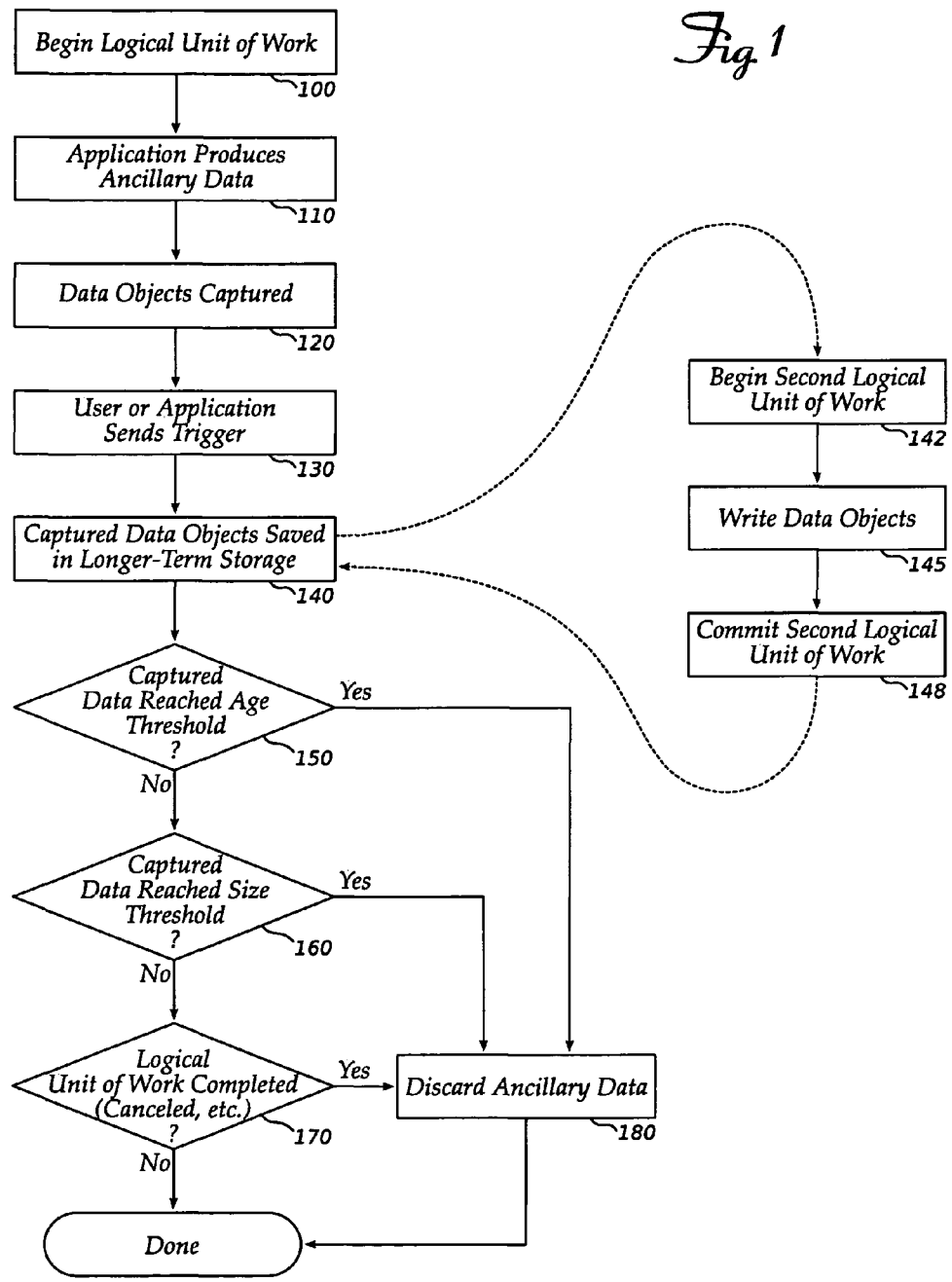
FIG. 1 shows an overview of the operations of an application capturing and storing ancillary data.

FIG. 1 is a flowchart outlining operations of an application that implements an embodiment of the invention. First, the application begins a logical unit of work (100). A logical unit of work might involve a number of related transactions, or might be a single transaction in itself. It can be thought of as the smallest function of the application that makes sense—smaller divisions may be incomplete, inconsistent, or nonsensical.

While performing the work, the application produces ancillary data (110). The ancillary data may be interesting or useful to a user or administrator of the application, but is not essential to the operation of the application. In other words, the ancillary data may be discarded without affecting the application. Statistics concerning the application's own operation (assuming that the application does something besides monitor itself), and log messages describing events or conditions, are examples of ancillary data that may be produced by an application.

The log messages or other ancillary data objects are captured or collected (120) and held temporarily (e.g. for a period of time, until a predetermined amount of data has been collected, or until the logical unit of work is complete).

While the ancillary data is still available, the user of the application may send a signal to trigger the subsequent operation (130). A signal may be a keystroke, button press, or other interaction that can be detected by an embodiment of the invention. Alternatively, the application itself can trigger the subsequent operation. For example, if the application detects an unexpected or unusual condition, it may initiate this action.

Once triggered, an embodiment stores the collected or captured data objects in longer-term storage (140). For example, log messages or other data may be written to a file or stored in a database. Alternatively, the information may be sent to a secondary store that has a longer retention period than the temporary store mentioned above, but that still discards the information after a period of time. This operation is performed without affecting the application's other operations on the current logical unit of work. For example, if the ancillary data is stored in a database, an embodiment of the invention may initiate a second, independent logical unit of work (142), write the data (145), and commit the second unit of work (148).

Note that the trigger to store collected data may occur at any time after the data is captured and before it is discarded. Some embodiments may discard data from temporary storage if it is stored in response to a trigger, while other embodiments may let the data linger until some other event or condition causes it to be discarded.

In some embodiments, captured ancillary data that reaches a certain age (150) will be discarded (180). In others, data that exceeds a certain size (160) will be discarded (180). One embodiment may discard data collected during the first logical unit of work when the unit of work is completed (or canceled, or otherwise finished) (170).

Figure 2:
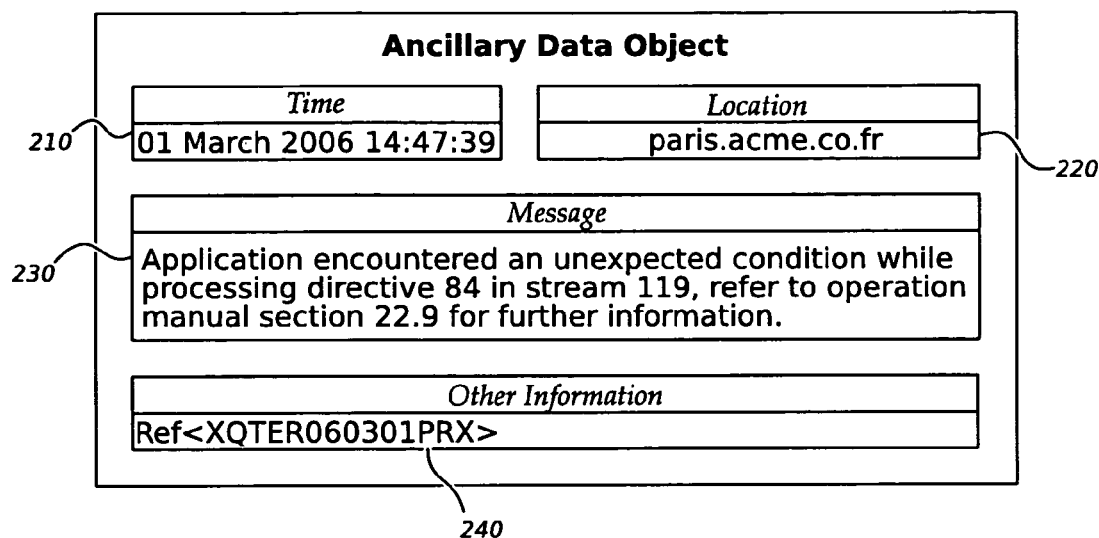
FIG. 2 shows some elements that may be present in an ancillary data object.

Each ancillary data object may have some or all of the elements shown in FIG. 2. First, the time (210) and location (220) where the object was captured may be stored. The location may indicate a computer system within a network, a physical location obtained from a Global Positioning Sensor ("GPS") or other peripheral device, a file and line number within a source code program, or other similar data that may be of interest to a user. Next, an object may have a text field (230) to contain human-readable information. In some cases, the text may be stored directly in the data object as a natural-language string (as shown here). Other embodiments may store a code, such as an integer index, that may be looked up in a table to find a corresponding message. The latter arrangement may be preferred in some instances because it permits easier language localization: by providing a table containing messages in another language, the ancillary data can be used by someone who speaks only that language.

Other information (240) may also be stored in a data object. This information may qualify or provide additional detail to the message in text field 230. It may be of fixed or variable size, and may be encoded to be useful to the user or to a second application that processes the ancillary data. In one embodiment, the "other information" may be an "opaque token" or "technical key"—that is, a value that may have no readily apparent or easily discernable meaning, but that can be processed (for example by software) to perform some useful operation. One example of a possible use for an opaque token is described below.

Figure 3:
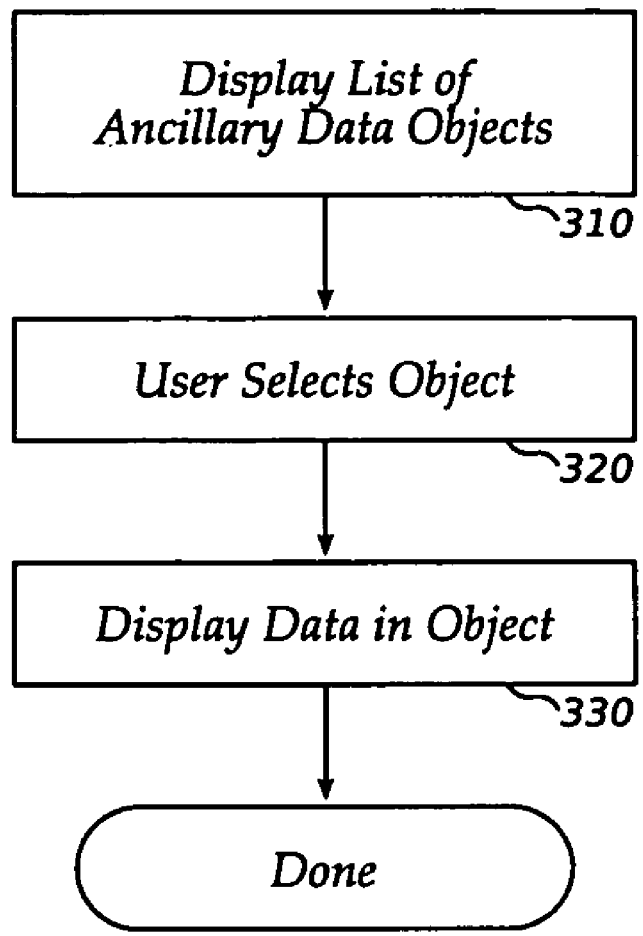
FIG. 3 describes operations of an application using previously-stored ancillary data.

A second application to deal with the ancillary data stored in response to a trigger can dramatically expand the capabilities of a system that collects or captures the data. The second application's functionality can also be integrated with the first application for convenience and ease of use. FIG. 3 shows a flow chart of one way the second application can work.

First, a list of collected ancillary data objects is displayed (310). The user is prompted to select one of the objects (320) and the data contained is displayed (330). For example, if the data object contains information similar to that discussed above in regard to FIG. 2, the second application might display a time, location, and text message. As mentioned earlier, the text message might be located by an index into an array of messages, which would permit the messages to be presented in any of a set of languages.

The second application may provide a special processing or display function to present the other information in a field like 240. As discussed below, some embodiments may use this information to tie the ancillary data object back to the point in time or the state of the first application when the data object was captured, or to a data element associated with the ancillary data.

FIG. 4A shows a data entry screen that might be presented by a first application whose main function is to accept order data from a clerk and store it in a database. The first application's logical unit of work, then, might be the entry of an order. Various data entry fields are shown; note particularly that the two line items 410 and 420 have no values entered for the weights of the corresponding materials.

If a clerk performing this entry inadvertently attempted to save or commit the order, the application might present a screen with error messages like that shown in FIG. 4B. Two messages 430 and 440 call the clerk's attention to the error on the previous screen.

In this simple example, the messages alone may be adequate to permit the clerk to correct the errors and complete the order entry. However, in many situations, the number and/or content of error messages may be overwhelming or confusing. Consequently, an application including an embodiment of the invention may provide a control such as "Save Messages" button 450 to trigger the preservation of error messages for later review. The clerk could then attempt to correct all of the errors, or could simply discard the uncompleted entry (without also losing the error messages, since they were saved through an independent mechanism such as a second logical unit of work).

FIG. 4C shows another screen that may be presented to assist a user in processing previously-saved error messages. The time and location information for each message, and the message itself, is saved. Note that, in this example, the messages are presented in a different language through the indexing and table-of-messages arrangement described earlier. Also, each message has a "Go To" button. The embodiment depicted here has used the opaque key saved with each error message to construct a hyperlink to data in the original data entry screen corresponding to the error message. This functionality may be particularly useful when, as here, the error messages are identical, but refer to two different errors. A user could activate "Go To" 460 and be taken to line 410, or "Go To" 470 to be taken to line 420. The erroneous data may also be highlighted to assist the user.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROMs), Read-Only Memory (ROMs), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that asynchronous, ancillary data processing can also be achieved by software and hardware that distribute the functions of embodiments of this invention differently than herein described. Such variations and implementations are understood to be captured according to the following claims.

I claim:
1. A computer implemented method comprising:
   collecting a plurality of ancillary data objects from an application, each ancillary data object to include a text token and an opaque token, the opaque token to link the ancillary data object to a database transaction;

storing the plurality of ancillary data objects independent from the database transaction;
canceling the database transaction without affecting the plurality of ancillary data objects;
deleting the plurality of ancillary data objects in response to the application beginning a new transaction;
preparing a hyperlink with the opaque token; and
displaying application data corresponding to the opaque token if the hyperlink is activated.

2. The method of claim 1, further comprising:
discarding data corresponding to an opaque token of one of the plurality of ancillary data objects.

3. The method of claim 1 wherein two of the plurality of ancillary data objects include an identical text token and different opaque tokens.

4. The method of claim 1 wherein each ancillary data object is a log message.

5. The method of claim 1 wherein the text token is one of a text string or an integer index of an array of text strings.

6. The method of claim 1, wherein the plurality of ancillary data objects are stored in response to a signal independent of an operation of the application.

7. A computer implemented method comprising:
collecting a plurality of messages pertaining to a first database transaction, each message to include a text token and an opaque token, the opaque token to link the message to the first database transaction;
opening a second database transaction;
storing the plurality of messages in the second database transaction;
committing the second database transaction;
canceling the first database transaction without affecting the plurality of messages in the second database transaction;
preparing a hyperlink with the opaque token; and
displaying application data corresponding to the opaque token if the hyperlink is activated.

8. The method of claim 7 wherein each message of the plurality of messages includes a technical key, the technical key to correlate the message with a data element in the first database transaction.

9. The method of claim 8, further comprising:
highlighting the data element associated with the technical key.

10. The method of claim 8, further comprising:
highlighting a data element associated with the technical key of a first message;
altering the data element; and
highlighting a data element associated with the technical key of a second message.

11. The method of claim 7 wherein each message of the plurality of messages includes a natural language string or an index to select a natural language string from an array of natural language strings.

12. A computer implemented method comprising:
opening a first database transaction;
detecting invalid data for the first database transaction;
opening a second database transaction;
storing a message regarding the invalid data in the second database transaction;
canceling the first database transaction without affecting the message regarding the invalid data in the second database transaction;
preparing a hyperlink with the opaque token; and
displaying application data corresponding to the opaque token if the hyperlink is activated.

13. The method of claim 12 wherein the message includes a natural language string and a technical key.

14. The method of claim 12, further comprising:
retrieving the message from a database; and
reconstructing a state of the first database transaction, the state to include the invalid data.

15. The method of claim 12, further comprising:
highlighting the invalid data for the first database transaction.

16. A non-transitory machine-readable medium containing instructions that, if executed by a programmable processor, cause a system containing the programmable processor to perform operations comprising:
collecting a plurality of ancillary data objects from an application, each ancillary data object to include an opaque token and a text message, the opaque token to link the ancillary data object to a database transaction;
storing the plurality of ancillary data objects independent from the database transaction;
canceling the database transaction without affecting the plurality of ancillary data objects;
deleting the plurality of ancillary data objects in response to the plurality of ancillary data objects exceeding a predetermined age, the plurality of ancillary data objects reaching a predetermined size, or the application completing a logical unit of work;
preparing a hyperlink with the opaque token; and
displaying application data corresponding to the opaque token if the hyperlink is activated.

17. The machine-readable medium of claim 16, containing additional instructions to cause the programmable processor to perform operations comprising:
displaying a list of stored ancillary data objects;
accepting a selection of one of the displayed ancillary data objects; and
highlighting data corresponding to the opaque token of the selected one of the ancillary data objects.

18. The machine-readable medium of claim 16, containing additional instructions to cause the programmable processor to perform operations comprising:
displaying a text message of one of the plurality of ancillary data objects in one of a first language or a second language, the message to be selected from a table of messages in the first language or a table of messages in the second language.

* * * * *